May 13, 1941.　　R. CRZELLITZER　　2,242,057
HYDRAULIC DEVICE
Filed March 23, 1938　　2 Sheets-Sheet 1

INVENTOR.
ROBERT CRZELLITZER.
BY

Patented May 13, 1941

2,242,057

UNITED STATES PATENT OFFICE 2,242,057

HYDRAULIC DEVICE

Robert Crzellitzer, Ivrea, Italy, assignor to the firm: Officina Meccanica Olivetti, Ivrea, Italy Application March 23, 1938, Serial No. 197,627
In Italy March 26, 1937

4 Claims. (Cl. 60—52)

The present invention relates to a new hydraulic device specially suitable for adjusting movements or displacements of parts of machine tools and specially in small machine tools. Normally these displacements are performed either by screw devices or by rack and pinion devices.

The movement by screw is slow and the operation is tiresome owing to friction losses; on the other hand the rack is not self-locking and therefore is unsafe, and often requires a too great strain of the hand for displacing heavy groups, being also difficult to stop in the exact position desired. The device according to the invention on the contrary, is simple, easy in operation, and absolutely positive. The new device consists essentially of a hydro-mechanical device, wherein, during the stroke of the operating lever which determines the upwards displacement of the body to be lifted, the liquid employed, preferably oil, serves as a simple connecting incompressible means between two mechanical parts, the same oil, during the return stroke, serving to retain the body lifted to the desired position, allowing the down stroke of the body only by opening of the apposite trap valve.

In the attached drawings there is shown, by way of example, the application of the device for the displacement of the head stock of a small drilling machine. In said drawings.

Figure 1:
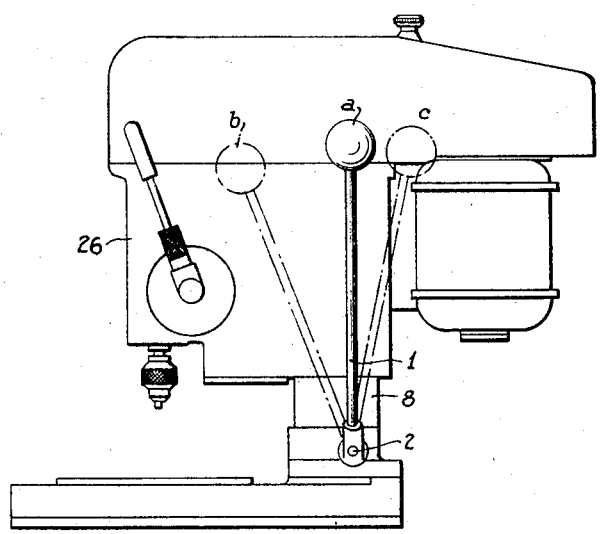
Fig. 1 represents a side view of the whole machine on a reduced scale.
Figure 2:
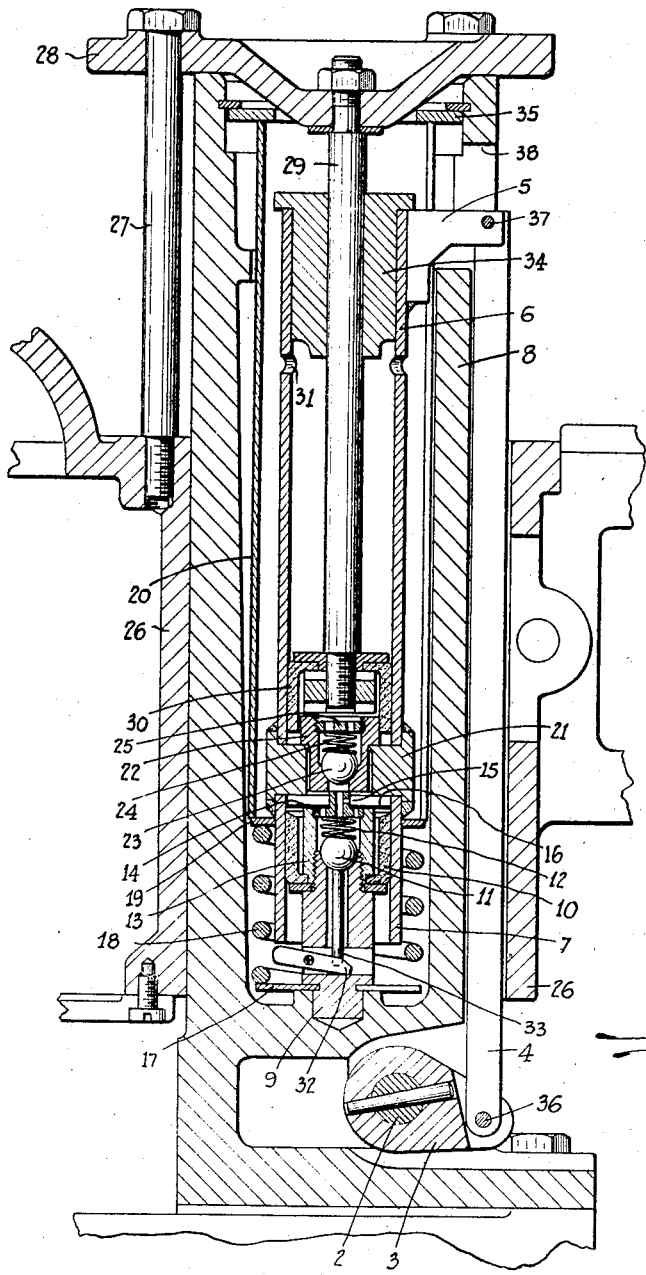
Fig. 2 represents on a larger scale a vertical section of column with the hydraulic device according to the invention.

In the embodiment represented, an operating handle 1 is pivoted on the spindle 2 whereon is also fixed the lever 3 which actuates a bar 4 connected thereto by a pin 36. Said bar serves simultaneously as a guide for the head stock 26 so that the latter cannot rotate relatively to the column 8 whereon it slides, and is connected by a pin 37 to a bracket 5 fixed to a cylinder 6 closed by a bottom piece 21, which in turn bears a second cylinder 7. A stem 9 is centered in a recess drilled in the bottom of column 8, and a piston 10, of leather or other suitable material, working in the cylinder 7, is fixed on said stem by means of a cup-shaped bolt 13. The stem 9 is bored axially and the bore is closed by a ball valve 11, provided with a spring 12 reacting against the bottom of the nut 13. Holes 14 for the passage of the oil are pierced in this bottom, which is provided also with a central projection 15 with a small axial hole the purpose of which will be explained further. A regulator disc 16 simply rests on said bottom.

The stem 9 is always kept down by the disc 17 (having a slot to allow assembly) pressed by the spring 18 reacting at its other end, by means of a washer 19, either against an arcuately shaped spacer 20, or against the bottom 21 of the cylinder 6 when this is forced down. The stem 9 might be secured to the bottom of the column 8 by any other suitable means as, for instance by screwing or force fit. The bottom 21 of the cylinders 6 and 7 has an axial bore wherein by means of a seat-piece 22 is mounted a valve 23 with spring 24 and reaction disc with holes 25. The support head 28 connected to the piston 30 by the stem 29 is secured by three support screw bolts 27 to the head stock 26.

The column 8, besides the principal object of bearing the head stock, serves also as a tank and is filled up with oil. Holes 31 in the cylinder 6 allow the oil to fill also said cylinder above the piston 30. As the column, open only at the top, has no other aperture, and the piston 30, even in its most elevated position does not overreach the oil level, any possibility of loss of oil is eliminated, which renders the device absolutely safe.

The drawings show the mechanism in its resting position. For lifting the head stock, the handle 1 is brought from the resting position a (Fig. 1) to the position b, thus rotating the spindle 2 so as to lift the bar 4 which in turn, as it has been seen, lifts the group of cylinders. During this motion, the oil contained between the bottom 21 and the piston 30 cannot escape, the valve 23 being closed and, therefore, the piston 30, together with the head stock connected therewith, follows the upwards motion. Simultaneously, the space between the bottom 21 and the fixed piston 10 increases, and consequently the oil which occupies the cavity of the column 8 enters therein by lifting the valve 11.

By returning the handle 1 to the first resting position a the bar 4 and the group of cylinders 6 and 7 lower; the valve 11 closes and the oil in the lower cylinder 7 is compressed and, by lifting the valve 23, passes into the upper cylinder 6. The quantity of oil contained in the lower cylinder 7 diminishes, during the displacement of the group of cylinders, by the same amount as the quantity in the upper cylinder 6 increases, because the total quantity of oil between the fixed piston 10 and the movable piston 30 must remain constant, the valve 11 being closed. Consequently the piston 30, having a diameter equal to that of the piston 10 remains stationary in the space during lowering of the group of cylinders. Since the head stock 26 is rigidly connected with piston 30, it also remains stationary.

At each oscillation of the handle from a to b and vice-versa, successive lifts of the piston 30 and head stock are produced, and the operation will be continued until the position desired will be reached.

It must be remarked that during lifting, the stroke of the group of cylinders is limited upwards, corresponding to the position b of the handle, by a fixed stop of the bar 4 which rests against the part 38 of the column 8; and downwards, corresponding to the position a of the handle, by the fact that the bottom 21 touches the washer 19 which, counteracted by the strong spring 18, constitutes a stop which cannot be overcome, unless this be done voluntarily by causing considerable increase of strain on the handle.

For lowering the head stock, the handle 1 is brought from the position a towards the position c, rotating the spindle 2 so that the bar 4 and the group of cylinders 6 and 7 are displaced downwards, overcoming the resistance of the spring 18. The projection 15 of the bottom of the cup-shaped nut lifts mechanically the valve 23 and the cylinder 7 lifts, by means of a lever 32, pivoted on the stem 9, and the rod 33, the valve 11 so that the oil can escape from the cylinders 6 and 7 and the head stock then lowers. So as to reduce the lowering speed, the disc 16 covers, during the lowering motion, the holes 14 in the bottom of the nut 13, allowing the passage of the oil only through a small hole suitably gauged. By releasing the handle 1, this and the cylinders 6 and 7, under the action of the spring 18 return immediately to the intermediate resting position a and the motion of the head stock is immediately stopped at the position reached. The upper end of the cylinder 6 is closed by a cap 34 serving as an upper guide between the stem 29 and the cylinder 6 and simultaneously, by sliding upwards and resting against the disc 35 as a stop at the end of the stroke for the piston 30.

In the attached drawings, the diameters of the cylinders 6 and 7 are the same. Of course it is possible to use cylinders having different diameters. By making, for instance, the lower cylinder larger than the upper, the lifting of the piston 30 would be obtained also during the return stroke of the operating handle 1. The bar 4 transmitting the motion of the handle 1 to the cylinder 6 serves also, as already stated, as a guide for the head stock. Of course a separate guide might be employed, the bar 4 being used only for the operation of the hydraulic device.

The group of the cylinders might be operated also from below without said bar 4. This would have the disadvantage, however, in that an aperture in the column 8, under the level of the oil, would be required for allowing the passage of the actuating organ, said aperture being provided with a stuffing box or similar device to prevent oil leakage. But this is not as safe as the solution described, wherein leakage is impossible, the control being from above.

What I claim is:

1. A device of the character described, comprising a displaceable piston, a displaceable part in operative relation with said piston, a first displaceable cylinder housing said piston, a cylinder head fixed to said first cylinder, a second displaceable cylinder fixed to said cylinder head and extending in opposite direction to said first cylinder, a stationary piston housed in said second cylinder, operating means adapted for imparting reciprocal displacement to both said first and second cylinders, said cylinder head having a passageway connecting both cylinders, a valve controlling said passageway of said cylinder head and operable to open automatically towards said first cylinder, said stationary piston being provided with a passageway, a second valve controlling said passageway of said stationary piston, and a liquid reservoir connected with said second cylinder through said passageway of said stationary piston, said second valve being operable automatically to close during displacement of said cylinders towards said stationary piston and to open during displacement of said cylinders in an opposite direction, said operating means including a crank and a link connecting said crank to one of said cylinders, whereby a valve controlled liquid flow passes through said stationary piston to said second cylinder, when said operating means are in one position, and from said second cylinder to said first cylinder and underneath said displaceable piston, when said operating means are in another position.

2. A device of the character described, comprising a displaceable piston, a displaceable part in operative relation with said piston, a first displaceable cylinder housing said piston, a cylinder head fixed to said first cylinder, a second displaceable cylinder fixed to said cylinder head and alignedly extending in opposite direction to said first cylinder, both of said cylinders being of the same diameter, a stationary piston housed in said second cylinder, operating means adapted for imparting reciprocal displacement to both said cylinders, said cylinder head having a passageway connecting both cylinders, a valve controlling said passageway of said cylinder head and operable to open automatically towards said first cylinder, said stationary piston being provided with a passageway, a second valve controlling said passageway of said stationary piston, and a liquid reservoir connected with said second cylinder through said passageway of said stationary piston, said second valve being operable automatically to close during displacement of said cylinders in a direction towards said stationary piston and to open during displacement of said cylinders in an opposite direction, said operating means including a crank and a link connecting said crank to one of said cylinders, a portion of said link connection longitudinally guiding said part upon displacement thereof, whereby a valve controlled liquid flow passes through said stationary piston to said second cylinder, when said operating means are in one position, and from said second cylinder to said first cylinder and underneath said displaceable piston, when said operating means are in another position.

3. A device of the character described, comprising a displaceable piston, a displaceable part in operative relation with said piston, a first displaceable cylinder housing said piston, a cylinder head fixed to said first cylinder, a second displaceable cylinder fixed to said cylinder head and alignedly extending in opposite direction to said first cylinder, both of said cylinders being of the same diameter, a stationary piston housed in said second cylinder, operating means adapted for imparting reciprocal displacement to both said cylinders, said cylinder head having a passageway connecting both cylinders, a valve controlling said passageway of said cylinder head and operable to open automatically towards said first cylinder, said stationary piston being provided with a passageway, a second valve controlling said passageway of said stationary piston, a liquid reservoir connected with said second cylinder through said passageway of said stationary piston, said second valve being operable automatically to close during displacement of said cylinders in a direction towards said stationary piston and to open during displacement of said cylinders in an opposite direction, and a disc loosely arranged within said second cylinder and adapted for restraining the flow of said liquid from said second cylinder into said passageway of said stationary piston, said operating means including a crank and a link connecting said crank to one of said cylinders, a portion of said link connection longitudinally guiding said part upon displacement thereof, whereby a valve controlled liquid flow passes through said stationary piston to said second cylinder, when said operating means are in one position, and from said second cylinder and underneath said displaceable piston, when said operating means are in another position.

4. A device of the character described, comprising a displaceable piston, a displaceable part in operative relation with said piston, a first displaceable cylinder housing said piston, a cylinder head fixed to said first cylinder, a second displaceable cylinder fixed to said cylinder head and alignedly extending in opposite direction to said first cylinder, both of said cylinders being of the same diameter, a stationary piston housed in said second cylinder, operating means adapted for imparting reciprocal displacement to both said cylinders, said cylinder head having a passageway connecting both cylinders, a valve controlling said passageway of said cylinder head and operable to open automatically towards said first cylinder, said stationary piston being provided with a passageway, a second valve controlling said passageway of said stationary piston, a liquid reservoir connected with said second cylinder through said passageway of said stationary piston, said second valve being operable automatically to close during displacement of said cylinders in a direction towards said stationary piston and to open during displacement of said cylinders in an opposite direction, said operating means including a crank and a link connecting said crank to one of said cylinders, a portion of said link connection longitudinally guiding said part upon displacement thereof, whereby a valve controlled liquid flow passes through said stationary piston to said second cylinder, when said operating means are in one position, and from said second cylinder to said first cylinder and underneath said displaceable piston, when said operating means are in another position, a spring encompassing said second cylinder and acting normally to limit motion of said cylinder head in one direction, and means for opening both valves when said operating means moves said cylinder head to compress said spring including a lever member actuatable by said second cylinder to open said second valve for allowing return flow of the liquid from said first cylinder through said second valve of said stationary piston to said reservoir.

ROBERT CRZELLITZER.